M. BLOCK.
SPRING.
APPLICATION FILED NOV. 22, 1916.
1,240,170.
Patented Sept. 18, 1917.
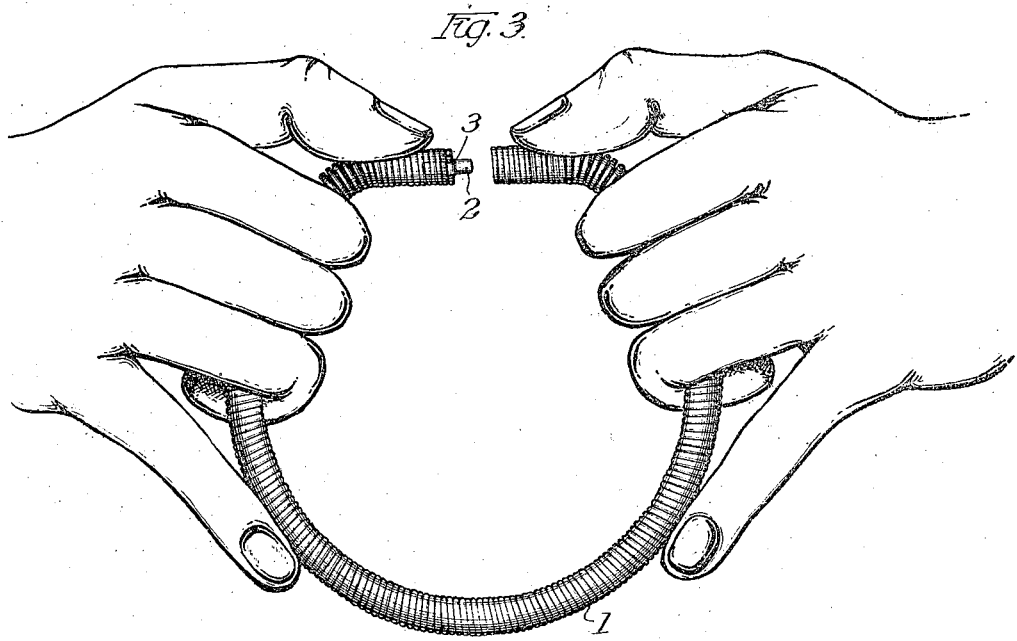
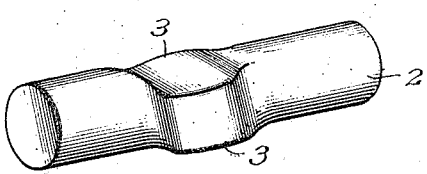
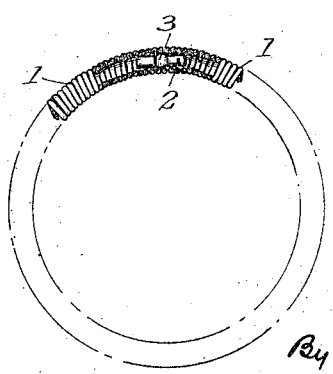
Inventor
Mandel Block
By Cheever & Cox
Attys.
Witnesses
Robert H. Weir
Arthur W. Carlson

UNITED STATES PATENT OFFICE.

MANDEL BLOCK, OF CHICAGO, ILLINOIS.

SPRING.

1,240,170.     Specification of Letters Patent.     Patented Sept. 18, 1917.

Application filed November 22, 1916. Serial No. 132,765.

*To all whom it may concern:*

Be it known that I, MANDEL BLOCK, a citizen of the United States, residing at Chicago, in the county of Cook and State of Illinois, have invented a certain new and useful Improvement in Springs, of which the following is a specification.

My invention subsists in a helical spring bent into the form of a torus. While my spring may be used for various purposes it is applicable, for example, to a force pump for plumbers' use of the type shown in my Patent No. 1,193,476, granted August 1, 1916.

The principal object of my invention is to provide simple and efficient means for securing the ends of a resilient helix together to form a spring ring or torus. Another object is to provide a construction such that the ends may be readily attached and detached as many times as desired without injuring either the helix or the fastening means.

I accomplish my objects by the mechanism illustrated in the accompanying drawings, in which:

Figure 1 is a fragmentary side view, partly in longitudinal section, of the finished ring.

Fig. 2 is a perspective view of the locking pin.

Fig. 3 is a perspective view illustrating the manner of connecting and disconnecting the ends of the helix.

Similar numerals refer to similar parts throughout the several views.

The body of the spring is formed of a resilient helix 1. In the preferred form the length is approximately thirty or forty times its outside diameter and the coils are approximately tangential when it is unstressed—that is, when straight. The locking pin 2 is approximately cylindrical, but in the best form has one or more shoulders 3 formed about midway between its ends for preventing it from entering too far into the ends of the helix. The simplest way to form such a pin is to upset it slightly by means of a round nose tool applied transversely at the point where the shoulder is to be formed. It will be understood, however, that the shoulders might be entirely omitted without entirely destroying the efficiency of the device. By preference, the length of the pin is about four times its diameter and its diameter is but slightly less than the internal diameter of the helix. One suitable form of pin is suggested in Fig. 2, although the shoulders are here somewhat exaggerated for illustrative purposes. Sizes and proportions, may, of course, be varied, but I will suggest appropriate proportions by saying that a spring having an outside diameter of about three and three-quarter inches could probably employ a helix of about ten and one-half inches length and a quarter inch diameter. The internal diameter of the helix may be approximately five-thirty-seconds of an inch and the pin approximately an eighth inch diameter with a length of approximately half an inch. As a matter of refinement, it is desirable that when finished, the spring ring present the appearance of being formed of a continuous or endless helix. To accomplish this, I so cut the helix that when assembled, the ends of the wire forming it will meet end to end. In other words, I see to it that the number of turns is a whole number and not a number containing a fraction.

In assembling, the operator first slips one end of the pin up to the shoulder into one end of the helix. He then grasps the two ends of the helix in the manner suggested in Fig. 3 and inserts the free end of the pin into the remaining open end of the helix. When the ends of the helix have been brought as close as possible together, they will, in the preferred construction, meet end to end, and the end of the wire at one end of the helix will abut the end of the wire at the other end of the helix. The operator then simply lets go, whereupon the action of the helix will firmly hold the parts assembled and the helix will assume the form of a substantially perfect helix or torus. I find as a matter of experience, that spring rings formed in this manner are not only remarkably true to form (that is, circular) but the ends of the helix hold together with unexpected tenacity. Unless the proximate ends of the helix are straightened out by thumb pressure as illustrated in Fig. 3, a remarkable resistance will be offered to a pull exerted in a direction to pull the ends of the helix apart. In other words, after the parts have been assembled, they hold together very firmly, due apparently to the gripping action which the helix exerts upon the locking pin. By straightening out the ends of the helix to release the pin, the ends may be detached and re-attached many times without causing any appreciable amount of wear. My spring ring, therefore, is not only simple to make and easy to assemble, but it holds together with great tenacity and may be assembled and reassembled many times without losing its efficiency.

Having thus described my invention, what I claim as new and desire to secure by Letters Patent, is:—

1. A spring ring consisting of a resilient helix the axis whereof is approximately rectilinear when the helix is under no strain, said helix having its ends brought together to form a torus, and a cylindrical pin inserted into the proximate ends of the bent helix, the diameter of the pin being but slightly less than the internal diameter of the helix whereby the pin, though smooth, is frictionally engaged by reason of the tendency of the helix to straighten out, and thereby, unaided, holds the ends of the helix together.

2. A torus-like spring consisting of a resilient helix having substantially tangential coils, and a pin having an external diameter slightly less than the internal diameter of the helix, said pin having a shoulder formed approximately midway between its ends for preventing it from being inserted too far into the helix.

3. A torus-like spring consisting of a helix having a length at least twenty times its external diameter, a cylindrical locking pin of a diameter slightly less than the internal diameter of the helix, said pin having a shoulder between its ends for abutting the ends of the helix to thereby prevent it from entering too far into the helix, and the ends of the helix passing over the ends of the pin a sufficient distance for the ends of the helix to approximately meet.

4. A torus-like spring composed of a resilient helix which is over twenty times as long as its external diameter, a cylindrical locking pin of a diameter slightly less than the internal diameter of the helix, the length of the pin being approximately four times its diameter, and means for preventing the pin from passing too far into the ends of the helix, the ends of the helix extending over the ends of the pin and substantially inclosing it.

5. A spring ring consisting of a helical spring whose length is upward of twenty times its diameter, the coils of the spring being approximately tangential when the helix is straight, a cylindrical locking pin inserted into the two ends of the helix to hold them together, the number of turns of the helix being approximately a whole number in distinction to a number containing a fraction, whereby when the ends of the spring are brought together, the turns of the helix will meet substantially end to end, thereby producing the appearance of a continuous helix in the finished article.

In witness whereof, I have hereunto subscribed my name.

MANDEL BLOCK.

Copies of this patent may be obtained for five cents each, by addressing the "Commissioner of Patents, Washington, D. C."